(12) United States Patent
Reuter et al.

(10) Patent No.: US 9,909,947 B2
(45) Date of Patent: Mar. 6, 2018

(54) PRESSURE SENSOR COMPRISING A TIP SECURED TO A PORT

(71) Applicant: Sensata Technologies, Inc., Attleboro, MA (US)

(72) Inventors: Calvin S. Reuter, Providence, RI (US); Ernie Schoot Uiterkamp, Heeten (NL); Daniel Goncalves, Milford, MA (US); Andrew Willner, Attleboro, MA (US); Mark McBrine, Attleboro, MA (US); Prasanth Ambady, Pawtucket, RI (US)

(73) Assignee: Sensata Technologies, Inc., Attleboro, MA (US)

(*) Notice: Subject to any disclaimer, the term of this patent is extended or adjusted under 35 U.S.C. 154(b) by 0 days.

(21) Appl. No.: 14/940,665

(22) Filed: Nov. 13, 2015

(65) Prior Publication Data
US 2017/0138809 A1    May 18, 2017

(51) Int. Cl.
*G01L 19/14* (2006.01)
*F02M 65/00* (2006.01)
*F02D 41/22* (2006.01)

(52) U.S. Cl.
CPC ......... *G01L 19/147* (2013.01); *F02M 65/003* (2013.01); *F02D 2041/224* (2013.01); *F02D 2200/0602* (2013.01)

(58) Field of Classification Search
CPC ......... G01L 9/04; G01L 7/08; G01L 19/0007; G01L 19/147; G01L 19/14; F02M 65/003
USPC .......................................................... 73/756
See application file for complete search history.

(56) References Cited

U.S. PATENT DOCUMENTS

| 5,101,659 | A | * | 4/1992 | Takeuchi | ................ G01L 23/10 73/114.19 |
| 5,222,397 | A | | 6/1993 | Kodama | |
| 5,741,974 | A | * | 4/1998 | Uemura | ............. G01L 19/0046 338/42 |
| 6,050,145 | A | | 4/2000 | Olson et al. | |
| 6,070,883 | A | | 6/2000 | Marto | |

(Continued)

FOREIGN PATENT DOCUMENTS

FR         2791430 A1   9/2000
WO     WO-2013083320 A1   6/2013

OTHER PUBLICATIONS

UK Combined Search and Examination Report under Sectons 17 and 18(3), dated Dec. 21, 2016, 10 pages.

*Primary Examiner* — Harshad R Patel
*Assistant Examiner* — Octavia Hollington
(74) *Attorney, Agent, or Firm* — Burns & Levinson LLP; Joseph M. Maraia; Daniel J. McGrath

(57) ABSTRACT

In an embodiment, a pressure sensor includes a tip secured to a port. The tip includes an opening for receiving pressure to be measured by the pressure sensor. The port includes a threaded section for mounting the pressure sensor in a fixture such as, for example, a rail. The port also includes a flexible section, a cavity, and an opening. The opening in the tip receives pressure from an outside source and channels the pressure to the opening of the port. The opening of the port receives the pressure from the tip and channels the pressure to the cavity. The pressure received in the cavity applies a force to the flexible section which flexes in response to the force. Moreover, forces are provided by the tip and the threaded section to keep the tip secured to the port.

10 Claims, 8 Drawing Sheets

(56) References Cited

U.S. PATENT DOCUMENTS

| | | | |
|---|---|---|---|
| 7,302,855 B2 * | 12/2007 | Oda | G01L 23/18 |
| | | | 73/756 |
| 7,316,164 B2 * | 1/2008 | Toyoda | G01L 9/0064 |
| | | | 73/114.18 |
| 8,950,247 B2 * | 2/2015 | Borgers | G01M 15/08 |
| | | | 73/114.18 |
| 9,063,031 B2 * | 6/2015 | Zwollo | G01M 15/08 |
| 9,063,033 B2 * | 6/2015 | Mayer | G01M 15/14 |
| 2002/0073533 A1 | 6/2002 | Park | |
| 2004/0200286 A1 | 10/2004 | Mast | |

* cited by examiner

PRESSURE SENSOR COMPRISING A TIP SECURED TO A PORT

BRIEF DESCRIPTION OF THE DRAWINGS

The accompanying drawings, which are incorporated in and constitute a part of this specification, illustrate one or more embodiments described herein and, together with the description, explain these embodiments. The components of the drawings are not necessarily drawn to scale, the emphasis instead being placed upon illustrating principles of the present disclosure. In the drawings.

DETAILED DESCRIPTION

Many internal combustion engines (ICEs) employ fuel injection systems for delivering fuel to combustion chambers contained in the ICEs. One type of fuel injection system that may be used is gasoline direct injection (GDI). GDI is a fuel injection technique that involves injecting gasoline at high pressure directly into an ICE's combustion chamber. GDI may more precisely measure fuel than other types of fuel delivery systems such as conventional fuel-injection systems and carburetors. GDI may result in more complete combustion and cooler cylinder temperatures that may enable a higher compression ratio for greater efficiency and power.

An ICE that employs GDI may utilize a pressure sensor to measure the pressure of fuel being injected into the ICE's combustion chambers. Example embodiments of pressure sensors that may be used are described below. In an embodiment, a pressure sensor may include a port that receives pressure to be measured and provisions for measuring the received pressure. These provisions may include, for example, a flexible section which may flex (strain) based on the pressure and one or more gauges (e.g., micro-strain gauges (MSGs)) that may measure the flexing of the flexible section.

More specifically, the pressure sensor may also include a port and a tip. The port may contain a cavity, the flexible section, and the one or more gauges. The tip may include an opening and provisions for sealing the pressure sensor after the pressure sensor is fitted in an operational environment. The port may be secured to the tip at an end of the port that receives pressure to be measured by the pressure sensor.

Operationally, the opening of the tip receives the pressure. The pressure is channeled by the tip to the cavity in the port. The flexible section is adjacent to the cavity (e.g., at an end of the cavity) and flexes based on the pressure channeled to the cavity. The gauges measure the flexing of the flexible section and produce an output that may be based on the measured flexing. The output may reflect a measurement of the pressure by the pressure sensor.

Figure 1:
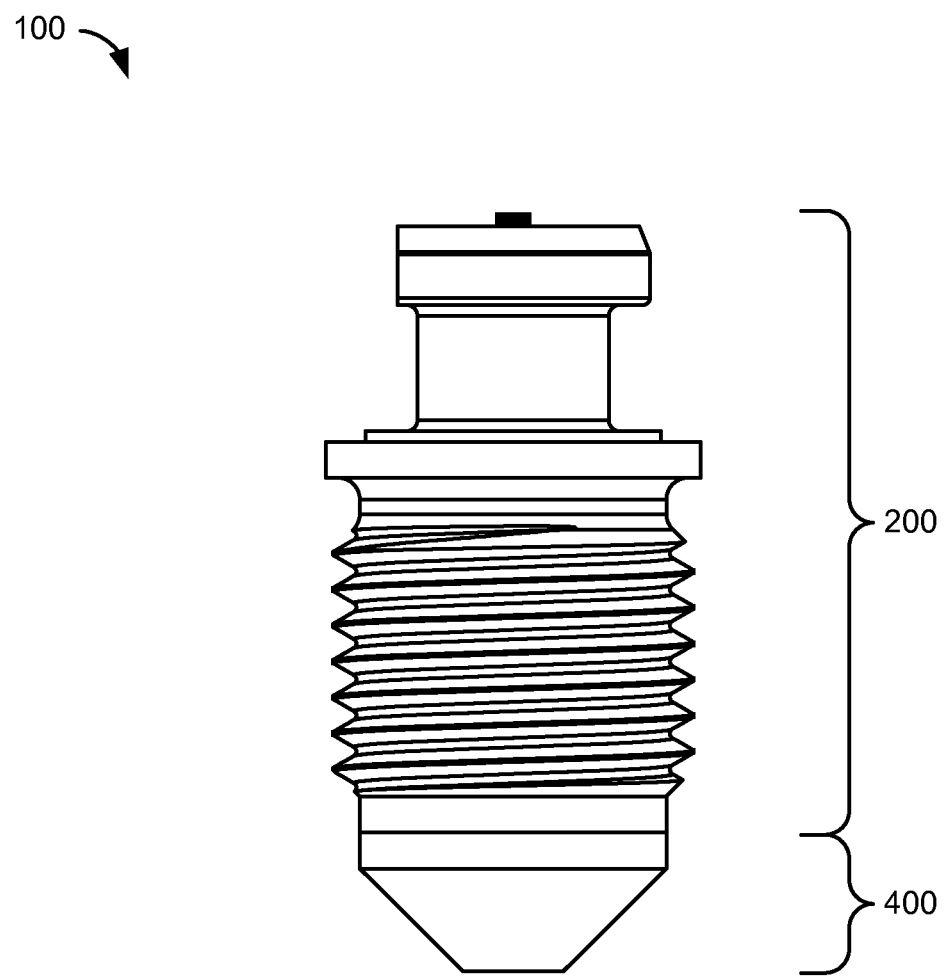
FIG. 1 illustrates an example embodiment of a pressure sensor having a port and a tip.

FIG. 1 illustrates an example embodiment of a pressure sensor 100. Referring to FIG. 1, the pressure sensor 100 may include a port 200 and a tip 400. As will be described further below, the port 200 may be secured to the tip 400. For example, in an embodiment, the port 200 and tip 400 are press-fitted together to secure the port 200 to the tip 400. In another embodiment, for example, the port 200 and the tip 400 are compressed together to secure the port to the tip 400. It should be noted that other techniques may be used to secure the port 200 to the tip 400. For example, in other embodiments the port 200 and the tip 400 are welded, soldered, brazed, and/or bonded (e.g., with an adhesive) together to secure the port 200 to the tip 400.

Also as will be described further below, the port 200 may include a cavity, a flexible section, and one or more gauges (e.g., MSGs). The cavity may receive pressure from an opening in the tip 400. The pressure may be channeled through the cavity to the flexible section which may flex in response to the pressure. The gauges may detect the flexing of the flexible section and produce an output that represents a measurement of the pressure.

Figure 2:
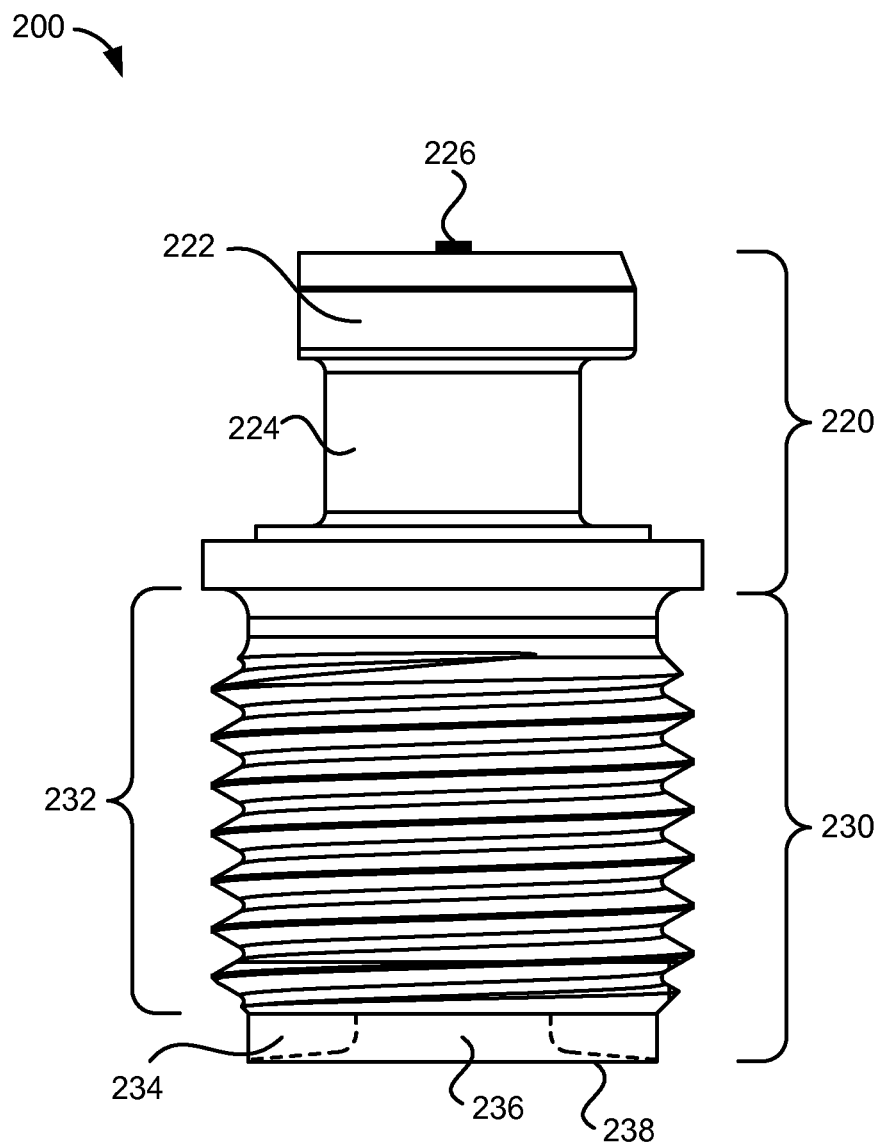
FIG. 2 illustrates an example embodiment of a port that may be used with the pressure sensor.

FIG. 2 illustrates an example embodiment of port 200. Referring to FIG. 2, port 200 may include a pedestal portion 220 and a mounting portion 230. The pedestal portion 220 may include, for example, a platform 222 and a neck 224.

The platform 222 may hold (e.g., contain) gauges 226. The gauges 226 may be MSGs and may be secured (e.g., bonded) to the platform 222. In an embodiment the gauges 226 are glass bonded to the top of the platform 222. The gauges 226 may be protected by, for example, a silicone-based conformal coat. The coat may protect the gauges 226 from, for example, corrosion. In an embodiment, the platform 222 may be attached to the neck 224 which may act to raise the platform 222 from the mounting portion 230. In an embodiment, the pedestal portion 220 and mounting portion 230 are machined from metal as a single piece that contains no joints.

The mounting portion 230 may include a threaded section 232 and a receiving section (e.g., a sleeve) 234. The threaded section 232 may include one or more threads that may be used to secure pressure sensor 100 when the pressure sensor 100 is mounted in a fixture (e.g., a rail). An example mounting of pressure sensor 100 in a fixture will be described further below.

The receiving section 234 may contain provisions for receiving tip 400 and securing tip 400 to the port 200. These provisions may include, for example, an opening 236 and an edge 238. The opening 236 may be used to receive the tip 400 and the edge 238 may act as a stop for the tip 400. Moreover, the edge 238 may provide a surface for securing the tip 400 to the port 200.

Opening 236 may act to accommodate assembling tip 400 with port 200. For example, opening 236 may be shaped to align tip 400 when the port 200 and tip 400 are joined. Here, for example, opening 236 may be sized to provide a snug fit with port 200 and hold the tip 400 in place to accommodate securing the tip 400 to the port 200 during an assembly of the pressure sensor 100.

Figure 3:
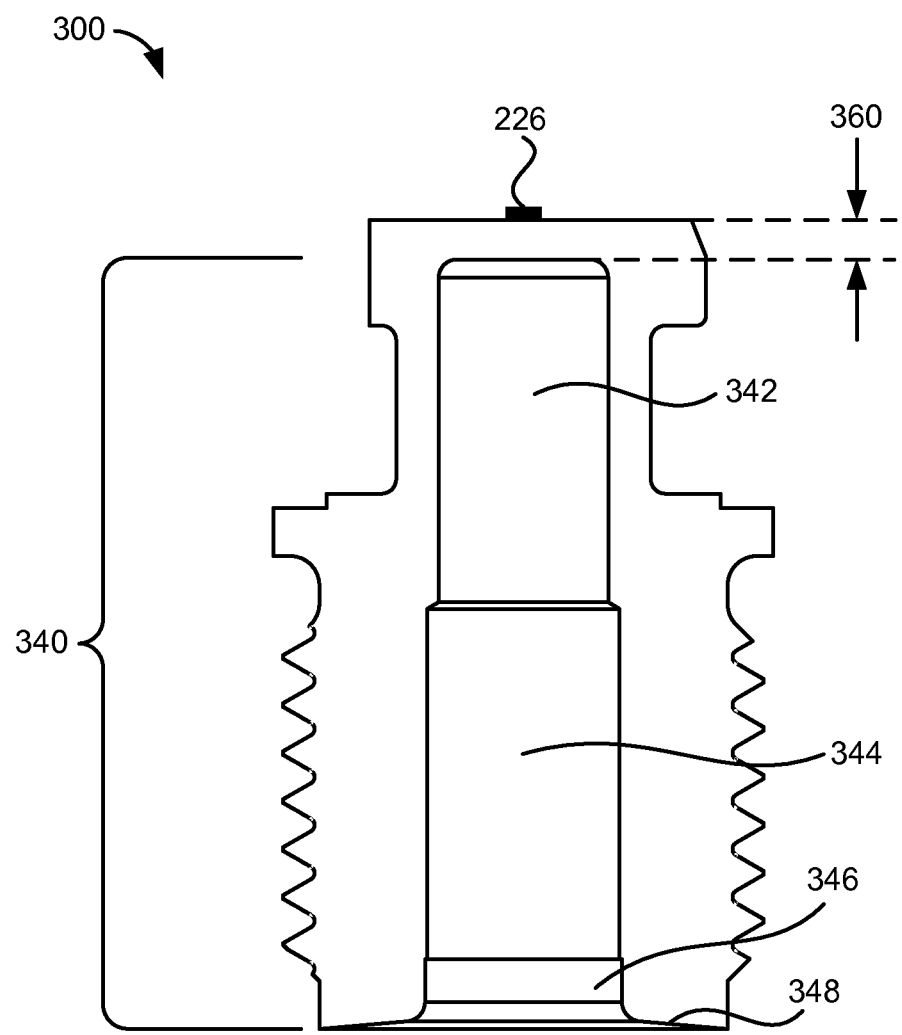
FIG. 3 illustrates a cross-sectional view of the port.

FIG. 3 illustrates a cross-sectional view 300 of port 200. Referring to FIG. 3, the port 200 may include a cavity 340 and a flexible section 360. The cavity 340 may be cylindrical in shape and may extend a length of the port 200. In an embodiment, the port 200 is 16.85 millimeters (mm) in length and the cavity 340 extends for 16.03 mm. It should be noted that in other embodiments, the port 200 and/or cavity 340 may be other lengths.

The cavity 340 may include multiple sections. For example, the cavity 340 may include a first section 342, a second section 344, and a third section 346. The first section 342 may be located at a closed end of the cavity 340 and the third section 346 may be located at an open end of the cavity 340. The second section 344 may be located between the first section 342 and the third section 346.

The cavity 340 may be stepped in that the first section 342, second section 344, and/or third section 346 may vary in length and/or width. For example, the width of the first section 342 may be smaller than the width of the second section 344 and the width of the second section 344 may be smaller than the width of the third section 346.

The port 200 may include a flexible section 360. The flexible section 360 may flex in response to, for example, pressure that enters the cavity 340 via opening 236 (FIG. 2). This flexing may be sensed by the one or more gauges 226 that may be mounted on a portion (e.g., top) of the flexible section 360. The gauges 226 may detect this flexing and produce an output (e.g., a voltage) in response to the detected flexing. The output may reflect an amount of strain of the flexible section 360 due to the pressure.

Note that sections 342, 344, and/or 346 may be shaped to perform various functions. For example, section 346 may be shaped to accurately locate tip 400 in port 200 when the tip 400 and port 200 are assembled. Also, for example, section 342 and/or section 344 may be shaped to achieve a certain response for a given pressure that enters cavity 340. For example, section 342 and/or section 344 may be shaped to cause a predefined amount of flex to flexible section 360 for a predefined amount of pressure that enters cavity 340.

It should be noted that cavity 340 may be shaped differently than illustrated in FIG. 3. For example, in an embodiment, cavity 340 gradually tapers inward towards the closed end of the cavity 340.

The third section 346 may include opening 236. Edge 348 may be part of the opening 236. As will be described further below, edge 348 may act, for example, as a stop for tip 400 when port 200 and tip 400 are joined. Moreover, as will also be described further below, edge 348, for example, may provide a surface for securing tip 400 to port 200 after the tip 400 and port 200 are joined.

Figure 4:
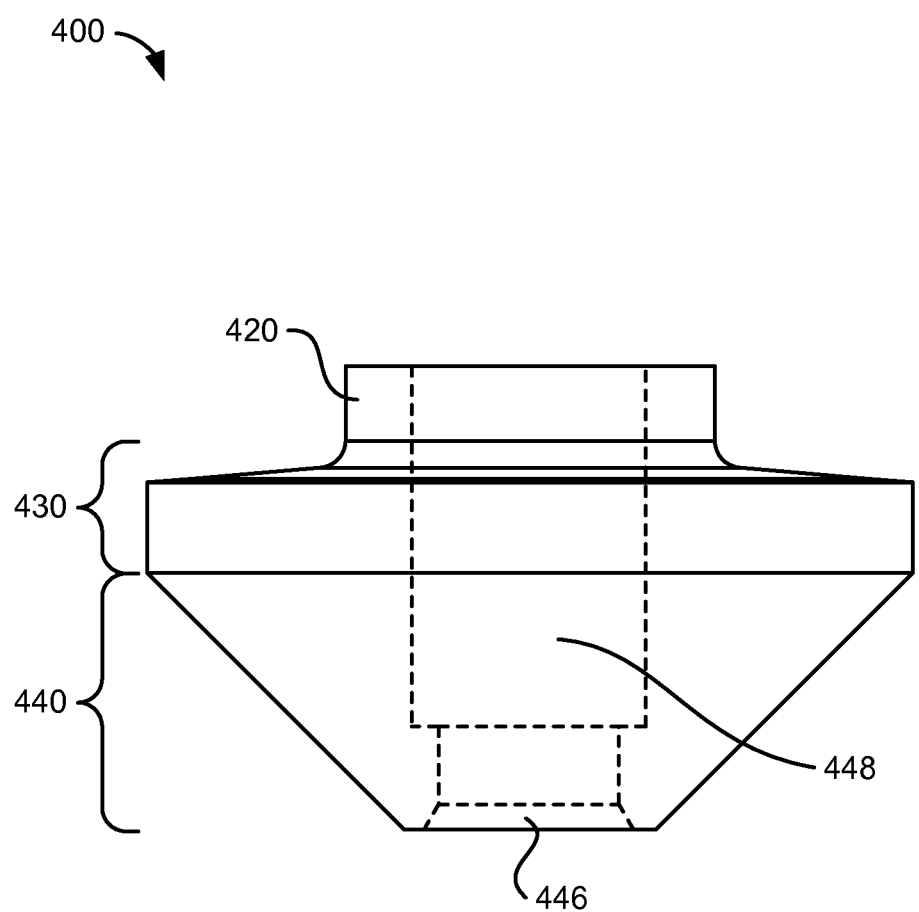
FIG. 4 illustrates an example embodiment of a tip that may be used with the pressure sensor.

FIG. 4 illustrates an example embodiment of tip 400. Referring to FIG. 4, tip 400 may include a guide 420, a platform 430, and a seat 440. The guide 420 may contain provisions for guiding the tip 400 into opening 236 when the tip 400 is joined with the port 200. The guide 420 may be cylindrically shaped, although in other embodiments the guide 420 may be shaped differently. For example, in an embodiment, guide 420 is polygonal shaped. Note that opening 236 may be shaped to accommodate the shape of the guide 420 and enable the guide 420 to fit in opening 236.

Platform 430 may provide a surface for stopping the tip 400 when the tip 400 is joined with the port 200. Moreover, the surface may provide a surface for securing the tip 400 with the port 200 after the tip 400 and port 200 are joined. Seat 440 may provide a surface for seating the tip 400 in a fixture when the pressure sensor 100 is mounted. An example mounting of pressure sensor 100 will be described further below. Tip 400 may include an opening 446 and a bore 448. Details regarding opening 446 and bore 448 will be described further below.

Figure 5:
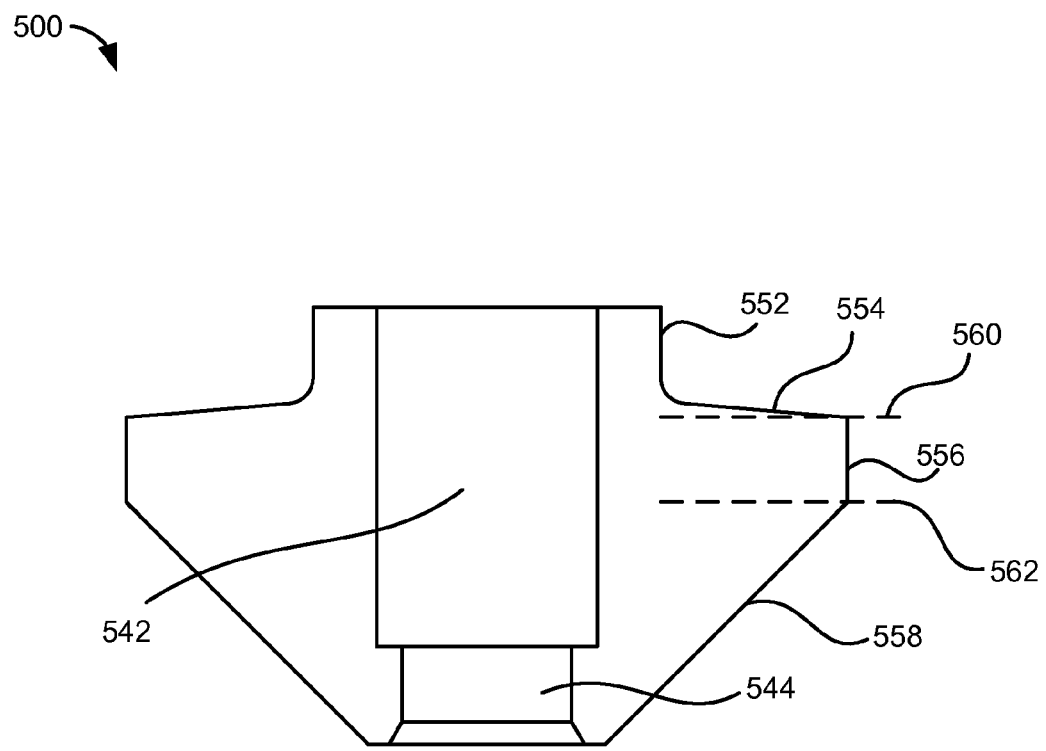
FIG. 5 illustrates a cross-sectional view of the tip.

FIG. 5 illustrates a cross-sectional view 500 of tip 400. Referring to FIGS. 4 and 5, the bore 448 may be cylindrically shaped and extend through the length of the tip 400. Opening 446 may be located at one end of the bore 448. Opening 446 may be shaped to accommodate receiving pressure, from an outside source, that is to be measured.

The bore 448 may be stepped. The stepping may include, for example, a first section 542 and a second section 544. The first section 542 may be cylindrically shaped and have a width that is less than a width of section 344 (FIG. 3) in port 200. The second section 544 may likewise be cylindrically shaped. The width of the second section 544 may be smaller than the width of the first section 542. Moreover, the length of the second section 544 may be smaller than the length of the first section 542.

It should be noted that in other embodiments, the lengths and widths of the first section 542 and/or the second sections 544 may be different. For example, in an embodiment the length of the first section 542 is smaller than the length of the second section 544.

In addition it should be noted that in other embodiments, the shape of bore 448 and/or opening 446 may be shaped differently than illustrated in FIGS. 4 and 5. For example, in an embodiment, bore 448 gradually tapers inwards from opening 446 towards guide 420.

Guide 420 may include edge 552. Platform 430 may include edges 554 and 556. Edge 554 may slope upwards from edge 556 to edge 552. The slope may be, for example, at an angle of zero to 70 degrees with respect to line 560. Note that in other embodiments, edge 554 may slope downwards from edge 556 to edge 552. Here, for example, the downward slope may be at an angle of zero to 70 degrees with respect to line 560.

It should be noted that lines 560 and 562 are intended to be reference lines that are used for illustrative purposes and are not part of the tip 400. In addition, it should be noted that lines 560 and 562 may be parallel to a base of the tip 400.

Guide 420 may also include an edge 558. Edge 558 may slope downwards with respect to line 562. The slope may be, for example, at an angle of 0 to 70 degrees with respect to line 562. As will be described further below, edge 558 may be shaped to accommodate seating the tip 400 in a fixture (e.g., a rail) when the pressure sensor 100 is mounted in the fixture. Also as will be described further below, edge 558 may be shaped to provide a force to the tip 400 to assist in keeping the tip 400 joined with the port 200 when the pressure sensor 100 is mounted in the fixture.

Figure 6:
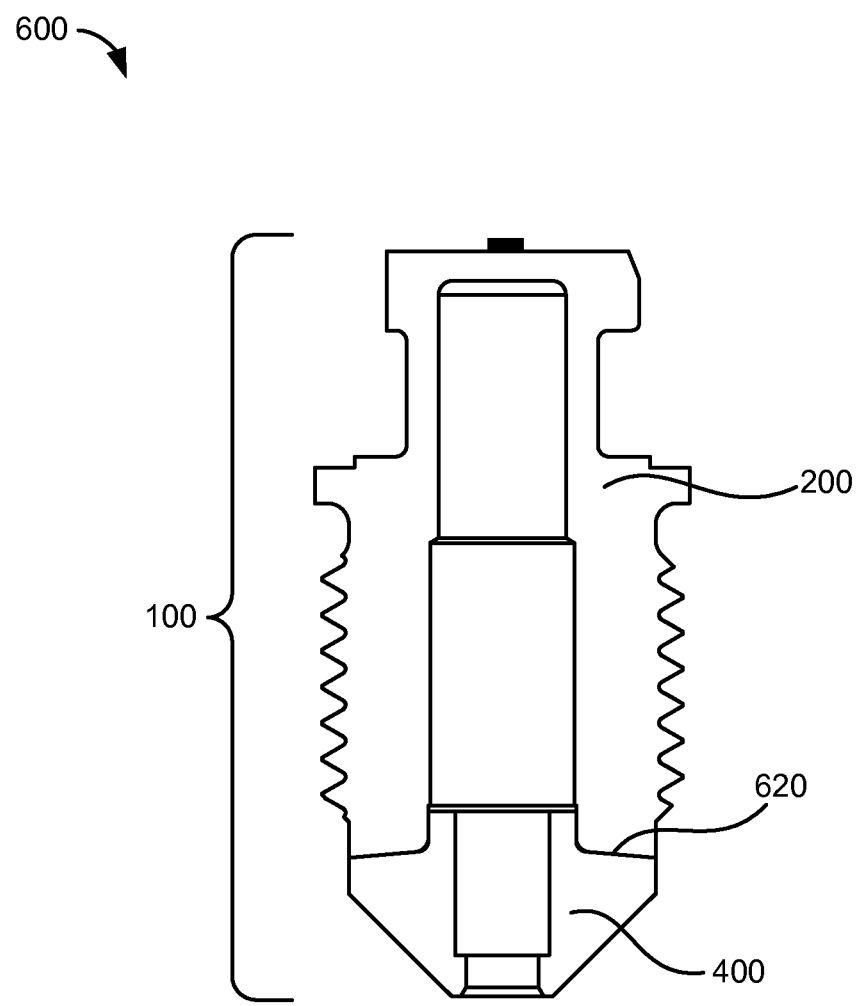
FIG. 6 illustrates a cross-sectional view of the pressure sensor.

FIG. 6 illustrates a cross-sectional view 600 of pressure sensor 100. Referring to FIG. 6, pressure sensor 100 may include port 200 joined with tip 400. Referring now to FIGS. 3-6, joining port 200 with tip 400 may involve for example, directing guide 420 into opening 236. Note that opening 236 and/or guide 420 may include provisions for accommodating aligning the guide 420 with the opening 236. These provisions may include, for example, shapes of the opening 236 and/or the guide 420.

As guide 420 enters opening 236, the guide 420 may enter into cavity 340 until edge 554 meets edge 348 at point 620. Note that edge 348 may be shaped to accommodate a tight fit with edge 554 at point 620.

After edge 554 meets edge 348, the tip 400 may be secured to the port 200. For example, tip 400 may be press fitted to port 200 up to point 620 to secure the tip 400 to the port 200. It should be noted that other techniques for securing tip 400 to port 200 may be used.

Figure 7:
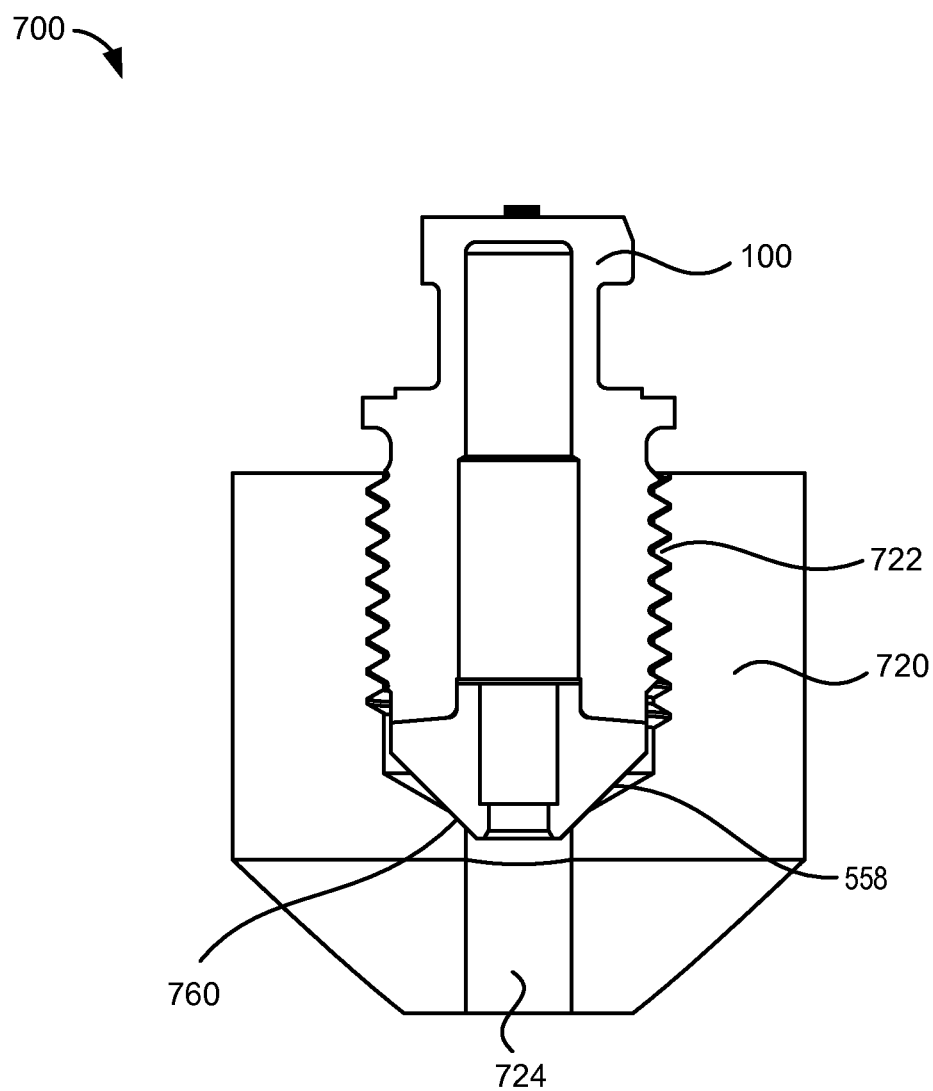
FIG. 7 illustrates a cross-section view of the pressure sensor mounted in a rail.

FIG. 7 illustrates a cross-section view 700 of an example mounting of pressure sensor 100. Referring to FIG. 7, pressure sensor 100 may be mounted in a rail 720. The rail 720 may include one or more threads 722 that may receive the threaded section 232 (FIG. 2) of the port 200 when the pressure sensor 100 is mounted in the rail 720.

The rail 720 may include an edge 760 that meets with edge 558 (FIG. 5) when the pressure sensor 100 is mounted in the rail 720. The edges 760 and 558 may accommodate seating the pressure sensor 100 in the rail 720. Moreover, edges 760 and 558 may act as a stop for pressure sensor 100 when mounting the pressure sensor 100 in the rail 720. For example, after edge 760 meets edge 558, further movement of the pressure sensor 100 into rail 720 may be stopped by edge 760 meeting edge 558.

Rail 720 may include an opening 724. The opening 724 may receive pressure from an outside source. The pressure may include pressure to be measured by the pressure sensor 100. The pressure received by the opening 724 may be channeled by the opening 724 to opening 446 (FIG. 4).

Referring now to FIGS. 1-7, operationally, pressure to be measured by the pressure sensor 100 may enter opening 724. Opening 724 may channel the pressure travels through opening 446 and bore 448 to cavity 340. In cavity 340 the pressure is applied to the flexible section 360 which flexes in response to the pressure. Gauges 226 measure the flexing of the flexible section 360 and produce an output. The output may represent, for example, a measurement of the pressure. In an embodiment, the output produced by the gauges 226 includes an electrical signal (e.g., a voltage).

Figure 8:
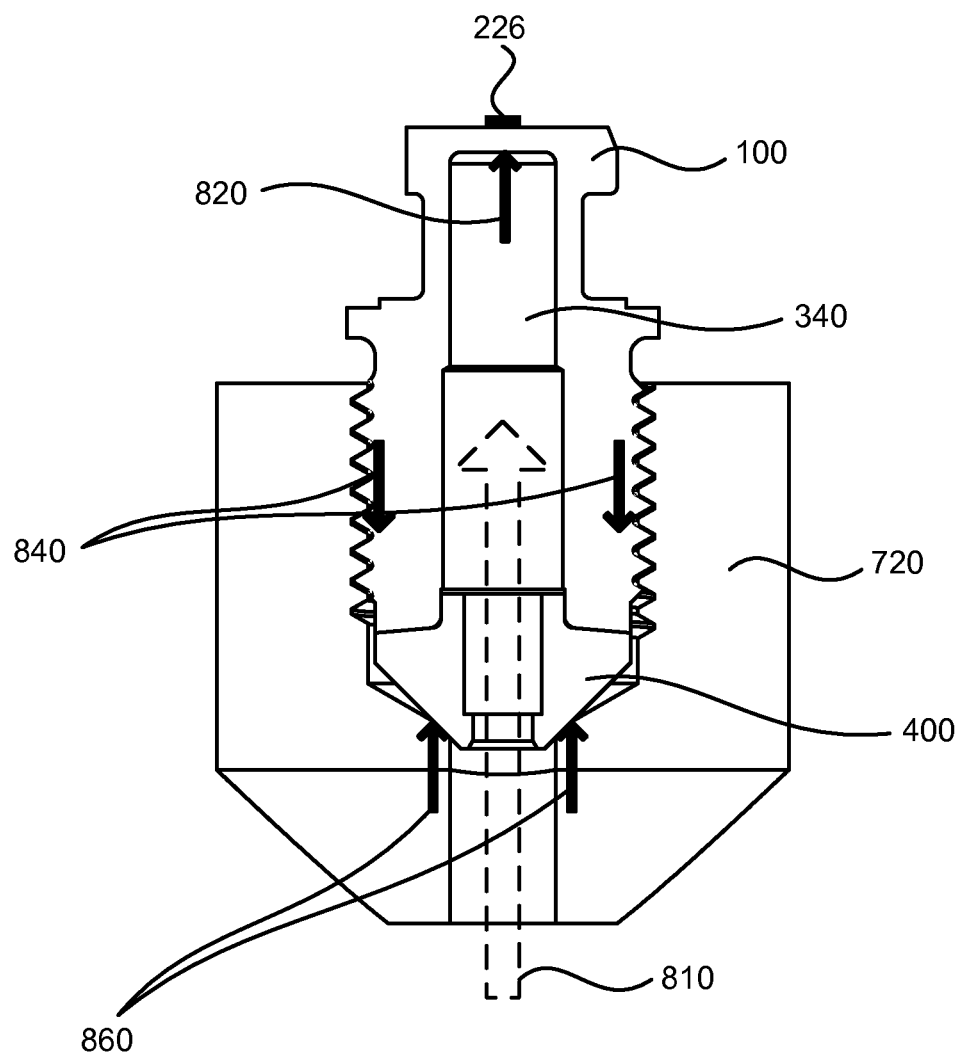
FIG. 8 illustrates forces that may be applied to the pressure sensor and the rail after the pressure sensor is mounted in the rail.

FIG. 8 illustrates forces that may be applied to the pressure sensor 100 and the rail 720 after the pressure sensor 100 is mounted in the rail 720 and placed into operation to measure pressure from an outside source. Referring to FIGS. 2-8, pressure 810 from the outside source may enter an opening 724 (FIG. 7) and be channeled to the cavity 340 (FIG. 3) via tip 400. The pressure may provide a force 820 to flexible section 360 (FIG. 3) and cause the flexible section 360 to flex. This flexing may be detected by gauges 226 (FIG. 3) which may produce an output that represents an amount of flexing detected by the gauges 226.

The threaded section 232 (FIG. 2) in combination with the threads 722 (FIG. 7) of the rail 720 may provide a force 840 which may oppose force 820. After the pressure sensor 100 is seated in the rail 720, a force 860 may be provided by tip 400. Force 860 may be provided after edge 558 (FIG. 5) meets edge 760 (FIG. 7). Force 860 may oppose force 840. Forces 860 and 840 may act to keep the tip 400 secured to the port 200.

For example, suppose port 200 and tip 400 are press fitted together in pressure sensor 100 and that pressure sensor 100 is mounted in rail 720. Pressure 810 may enter opening 724 which channels the pressure 810 to cavity 340 via opening 446 (FIG. 4), bore 448 (FIG. 4), and opening 236 (FIG. 2). The pressure 810 may cause a force 820 to be applied to flexible section 360. The flexible section 360 may flex in response to the force 820 and the flexing of flexible section 360 may be sensed by gauges 226 which may output a signal that represents the sensed flexing.

The force 820 applied to flexible section 360 may be countered by force 840. In addition, force 840 may be countered by force 860. The combination of force 840 and 860 may act to relieve stress that may be present at point 620 due to, for example, force 820. Relieving this stress may cause the press fitting of port 200 and tip 400 to hold and thereby keep the tip 400 and port 200 joined.

The foregoing description of embodiments is intended to provide illustration and description but is not intended to be exhaustive or to limit the invention to the precise form disclosed. Modifications and variations are possible in light of the above teachings or may be acquired from practice of the invention.

No element, act, or instruction used herein should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

It is intended that the invention not be limited to the particular embodiments disclosed above, but that the invention will include any and all particular embodiments and equivalents falling within the scope of the following appended claims.

What is claimed is:

1. A pressure sensor comprising:
   a tip having an opening for receiving pressure to be measured by the pressure sensor; and
   a port secured to the tip, the port having:
   a threaded section for mounting the pressure sensor in a threaded mounting bore defined by a rail of an internal combustion engine so that when mounted, the threaded mounting bore and threaded section create a compressive force to maintain the tip and port sealingly engaged,
   a stepped cavity, and
   an opening for channeling pressure, received by the opening of the tip, to the cavity,
   wherein the tip includes a guide that fits inside of the opening of the port.

2. The pressure sensor of claim 1, wherein the tip includes a bore, and wherein the opening of the tip is located at one end of the bore.

3. The pressure sensor of claim 1, wherein the tip includes a platform adjacent to the guide, and
   wherein the guide includes a first edge and the platform includes a second edge and a third edge, and
   wherein the second edge has a first end and a second end, the first end being opposite of the second end, the first end being adjacent to the first edge and second end being adjacent to the third edge, and wherein the second edge slopes at an angle from the first end towards the second end.

4. The pressure sensor of claim 1, wherein the port and tip are press-fitted together to secure the port to the tip.

5. The pressure sensor of claim 1, wherein the port and the tip are welded together to secure the port to the tip.

6. The pressure sensor of claim 1, wherein the port and the tip are soldered together to secure the port to the tip.

7. The pressure sensor of claim 1, wherein the port and the tip are bonded together with an adhesive to secure the port to the tip.

8. The pressure sensor of claim 1, wherein the port and the tip are compressed together to secure the port to the tip.

9. The pressure sensor of claim 1, wherein the cavity includes a first section, a second section, and a third section, and
   wherein the first section has a width that is smaller than the second section and the second section has a width that is smaller than the third section.

10. A pressure sensor comprising:
    a tip having an opening for receiving pressure to be measured by the pressure sensor; and
    a port secured to the tip, the port having:
    a threaded section for mounting the pressure sensor in a threaded mounting bore defined by a rail of an internal combustion engine so that when mounted, the threaded mounting bore and threaded section create a compressive force to maintain the tip and port sealingly engaged, a stepped cavity, and an opening for channeling pressure, received by the opening of the tip, to the cavity, wherein the tip includes a guide and a platform and the port includes an opening, and wherein the guide enters the opening of the port, and wherein the platform includes an edge that acts as a stop for the tip to limit an entrance of the guide into the opening.

\* \* \* \* \*